United States Patent
Adam et al.

(10) Patent No.: US 10,382,151 B2
(45) Date of Patent: Aug. 13, 2019

(54) PARALLEL TESTING OF MULTIPLE OPTICAL FIBERS

(71) Applicant: AFL TELECOMMUNICATIONS LLC, Duncan, SC (US)

(72) Inventors: Sean Adam, Wrentham, MA (US); D. Dane Krampitz, Groton, MA (US); Joseph Fitzgerald, Concord, NH (US)

(73) Assignee: AFL Telecommunications LLC, Duncan, SC (US)

( * ) Notice: Subject to any disclaimer, the term of this patent is extended or adjusted under 35 U.S.C. 154(b) by 169 days.

(21) Appl. No.: 15/111,510

(22) PCT Filed: Jan. 14, 2015

(86) PCT No.: PCT/US2015/011403
§ 371 (c)(1),
(2) Date: Jul. 14, 2016

(87) PCT Pub. No.: WO2015/108978
PCT Pub. Date: Jul. 23, 2015

(65) Prior Publication Data
US 2016/0344486 A1 Nov. 24, 2016

Related U.S. Application Data

(60) Provisional application No. 61/927,249, filed on Jan. 14, 2014.

(51) Int. Cl.
G02B 6/44 (2006.01)
H04B 17/30 (2015.01)
H04B 3/46 (2015.01)
H04B 10/073 (2013.01)

(52) U.S. Cl.
CPC .............. H04B 17/30 (2015.01); H04B 3/46 (2013.01); H04B 10/073 (2013.01)

(58) Field of Classification Search
USPC ...................... 356/73.1; 385/16, 100, 134
See application file for complete search history.

(56) References Cited

U.S. PATENT DOCUMENTS 5,991,270 A 11/1999 Zwan et al.
6,028,661 A * 2/2000 Minami ............. G01M 11/3136
356/73.1

(Continued)

OTHER PUBLICATIONS

AFL TELECOMMUNICATIONS, LLC; International Patent Application No. PCT/US2015/011403; International Search Report; Apr. 10, 2015; (2 pages).

(Continued)

Primary Examiner — Lam S Nguyen
(74) Attorney, Agent, or Firm — Dority & Manning, P.A.

(57) ABSTRACT

A method of concurrently testing a plurality of transmission mediums, using a testing device incorporating at least one processor and a single test program that allows a user to view multiple instruments as a single instrument with multiple input and output ports, includes setting up a plurality of instrument functions to perform tests on the plurality of transmission mediums using the single test program, and concurrently performing tests on the plurality of transmission mediums using the plurality of instrument functions.

14 Claims, 5 Drawing Sheets

(56) References Cited

U.S. PATENT DOCUMENTS

| | | | | |
|---|---|---|---|---|
| 6,055,343 A | * | 4/2000 | Pimpinella | G02B 6/3502 385/134 |
| 6,614,968 B1 | * | 9/2003 | Eslambolchi | G02B 6/4469 385/100 |
| 2007/0025676 A1 | * | 2/2007 | Russell | G01M 11/3136 385/134 |
| 2011/0286345 A1 | | 11/2011 | Goue et al. | |
| 2012/0011290 A1 | | 1/2012 | Warner et al. | |
| 2013/0326290 A1 | | 12/2013 | Elserougi et al. | |

OTHER PUBLICATIONS

AFL Telecommunications, LLC; European Patent Application No. EP15737690; Supplemental European Search Report; dated Jul. 3, 2017; (1 page).

Bitting M J ED—Institute of Electrical and Electronics Engineers: "Optical switching for automated test systems", 2002 I EEE AutoTestCon Proceedings. Systems Readiness Technology Conference .AutoTestCon 2002. Huntsville, Al. Oct. 15-17, 2002; [IEEE AutoTestCon Proceedings : IEEE Systems Readiness Technology Conference ], New York, NY : IEEE, US, vol. CONF. 38, Oct. 10, 2002 (Oct. 10, 2002), pages 140-151, XP010615755,DOI: 10.1109/ AUTEST .2002.1047885 ISBN: 978-0-7803-7441-6, section 1, section 3.4.1, section 3.4.2, section 4.1, section 4.2.1; figure 5.

National Instruments: "Parallel Test Architectures for Reducing the Cost to Test", Jul. 9, 2013 (Jul. 9, 2013), XP055386140, Retrieved from the Internet: URL :http://www .ni.com/white-paper/3757/en/ [retrieved on Jun. 28, 2017] page 1, "Overview", page 3, line 1-line 7; figure 5, page 6, line 4-line 12.

\* cited by examiner

PARALLEL TESTING OF MULTIPLE OPTICAL FIBERS

CROSS-REFERENCE TO RELATED APPLICATIONS

This application is based upon and claims the benefit of priority from U.S. Provisional Patent Application No. 61/927,249, filed. Jan. 14, 2014 in the United States Patent and Trademark Office, and as a U.S. national stage filing of International Application No. PCT/US2015/011403 having an international filing date of Jan. 14, 2015, the disclosures of both of which are incorporated by reference herein in their entireties.

BACKGROUND

1. Field

The invention is related to parallel testing of a plurality of transmission mediums (such as optical fibers, copper wires, and wireless transmission mediums), and more particularly to use parallel instrument functions to test multiple transmission mediums at the same time to save overall test time.

2. Related Art

The background information provided herein is for the purpose of generally presenting the context of the disclosure. Work of the presently named inventor, to the extent it is described in this background section, as well as aspects of the description that may not otherwise qualify as prior art at the time of filing, are neither expressly nor impliedly admitted as prior art against the present disclosure.

Current optical technology uses a single set of instruments or instrument functions to test a fiber, and sequential fibers are tested serially, so test time for N Fibers is n×(the setup time and test time) of a single fiber.

Although testing multiple transmission mediums (such as fibers) with multiple instruments today is possible, a user needs to setup each instrument independently and then manually start the test on each one of them.

Accordingly, there is a need for a single test program that incorporates setup, start of test, as well as data collection together. Under the control of such a single test program (which might run on one or more personal computers (PCs), smartphones, tablets), a test setup may be created for one instrument and then seamlessly driven into a plurality of like instruments.

SUMMARY

Exemplary implementations of the present invention address at least the above problems and/or disadvantages and other disadvantages not described above. Also, the present invention is not required to overcome the disadvantages described above, and an exemplary implementation of the present invention may not overcome any of the problems listed above.

According to an aspect of an exemplary embodiment, a method of concurrently testing a plurality of transmission mediums, using a testing device incorporating at least one processor and a single test program that allows a user to view multiple instruments as a single instrument with multiple input and output ports, the method includes setting up a plurality of instrument functions to perform tests on the plurality of transmission mediums using the single test program, and concurrently performing tests on the plurality of transmission mediums using the plurality of instrument functions.

According to another exemplary embodiment, the plurality of transmission mediums are one of fiber, copper or wireless transmission medium.

According to another aspect of an exemplary embodiment, a method of testing a plurality of transmission mediums, using a testing device incorporating at least one processor and a single test program that allows a user to view multiple instruments as a single instrument with multiple input and output ports, the method including setting up a first instrument function to perform tests a first transmission medium, using the single test program, while concurrently testing a second transmission medium using a second instrument function, and setting up the second instrument function to perform tests on a third transmission medium, using the single test program, while concurrently testing the first transmission medium using the first instrument function.

According to another exemplary embodiment, the plurality of transmission mediums may be fibers, copper wires or wireless transmission mediums, and the first transmission medium, the second transmission medium and the third transmission medium may be fibers, copper wires, or wireless transmission mediums.

According to another aspect of an exemplary embodiment, a method of testing a plurality of transmission mediums, using a testing device incorporating at least one processor and a single test program that allows a user to view multiple instruments as a single instrument with multiple input and output ports, the method including setting up a first plurality of instrument functions to perform test a first plurality of transmission mediums, using the single test program, while concurrently testing a second plurality of transmission mediums using a second plurality of instrument functions, and setting up the second plurality of instrument functions to perform test on a third plurality of transmission mediums, using the single test program, while concurrently testing the first plurality of transmission mediums using the first plurality of instrument functions.

According to another exemplary embodiment, the plurality of transmission mediums may be fibers, copper wires or wireless transmission mediums, and the plurality of first transmission mediums, the plurality of second transmission mediums and the plurality of third transmission mediums may be fibers, copper wires or wireless transmission mediums.

According to another aspect of an exemplary embodiment, an apparatus for testing a plurality of transmission mediums includes at least one memory operable to store program code, a plurality of instrument functions, and at least one processor operable to read the program code and operate as instructed by the program code, the program code including setting code configured to cause the at least one processor to set up the plurality of instrument functions to perform test the plurality of transmission mediums, and testing code configured to cause the at least one processor to perform test on the plurality of transmission mediums using the plurality of instrument functions.

According to another exemplary embodiment, the plurality of transmission mediums may be fibers, copper wires or wireless transmission mediums.

According to another aspect of an exemplary embodiment, an apparatus for testing a plurality of transmission mediums transmission mediums includes at least one memory operable to store program code, a plurality of instrument functions, and at least one processor operable to read the program code and operate as instructed by the program code, the program code including first testing code configured to cause the at least one processor to set up a first instrument function to perform tests a first transmission medium and concurrently perform tests on a second transmission medium using a second instrument function.

According to another exemplary embodiment, the program code further includes second testing code configured to cause the at least one processor to set up the second instrument function to perform tests on a third transmission medium and concurrently perform tests on the first transmission medium using the first instrument function.

According to another exemplary embodiment, the plurality of transmission mediums may be fibers, copper wires or wireless transmission mediums, the second transmission medium and the third transmission medium may be fibers, copper wires or wireless transmission mediums.

According to another aspect of an exemplary embodiment, a non-transitory computer readable recording medium stores a program used in an apparatus, including at least one processor, for setting up a plurality of instrument functions to perform tests on the plurality of transmission mediums, and concurrently performing tests on the plurality of transmission mediums using the plurality of instrument functions.

According to another exemplary embodiment, the plurality of transmission mediums may be fibers, copper wires or wireless transmission mediums.

According to another aspect of an exemplary embodiment, a non-transitory computer readable recording medium stores a program used in an apparatus, including at least one processor, for setting up a first instrument function to perform tests a first transmission medium and concurrently performing tests on a second transmission medium using a second instrument function.

According to another exemplary embodiment, the program further causes said at least one processor to set up the second instrument function to perform tests on a third transmission medium and concurrently perform tests on the first transmission medium using the first instrument function.

According to another exemplary embodiment, the plurality of transmission mediums may be fibers, copper wires or wireless transmission mediums, and the first transmission medium, the second transmission medium and the third transmission medium may be fibers, copper wires or wireless transmission mediums.

DETAILED DESCRIPTION

The following detailed description is provided to assist the reader in gaining a comprehensive understanding of the methods, apparatuses and/or systems described herein. Various changes, modifications, and equivalents of the systems, apparatuses and/or methods described herein will suggest themselves to those of ordinary skill in the art. Descriptions of well-known functions and structures are omitted to enhance clarity and conciseness.

The terms used in the description are intended to describe embodiments only, and shall by no means be restrictive. Unless clearly used otherwise, expressions in a singular form include a meaning of a plural form. In the present description, an expression such as "comprising" or "including" is intended to designate a characteristic, a number, a step, an operation, an element, a part or combinations thereof, and shall not be construed to preclude any presence or possibility of one or more other characteristics, numbers, steps, operations, elements, parts or combinations thereof.

Figure 1:
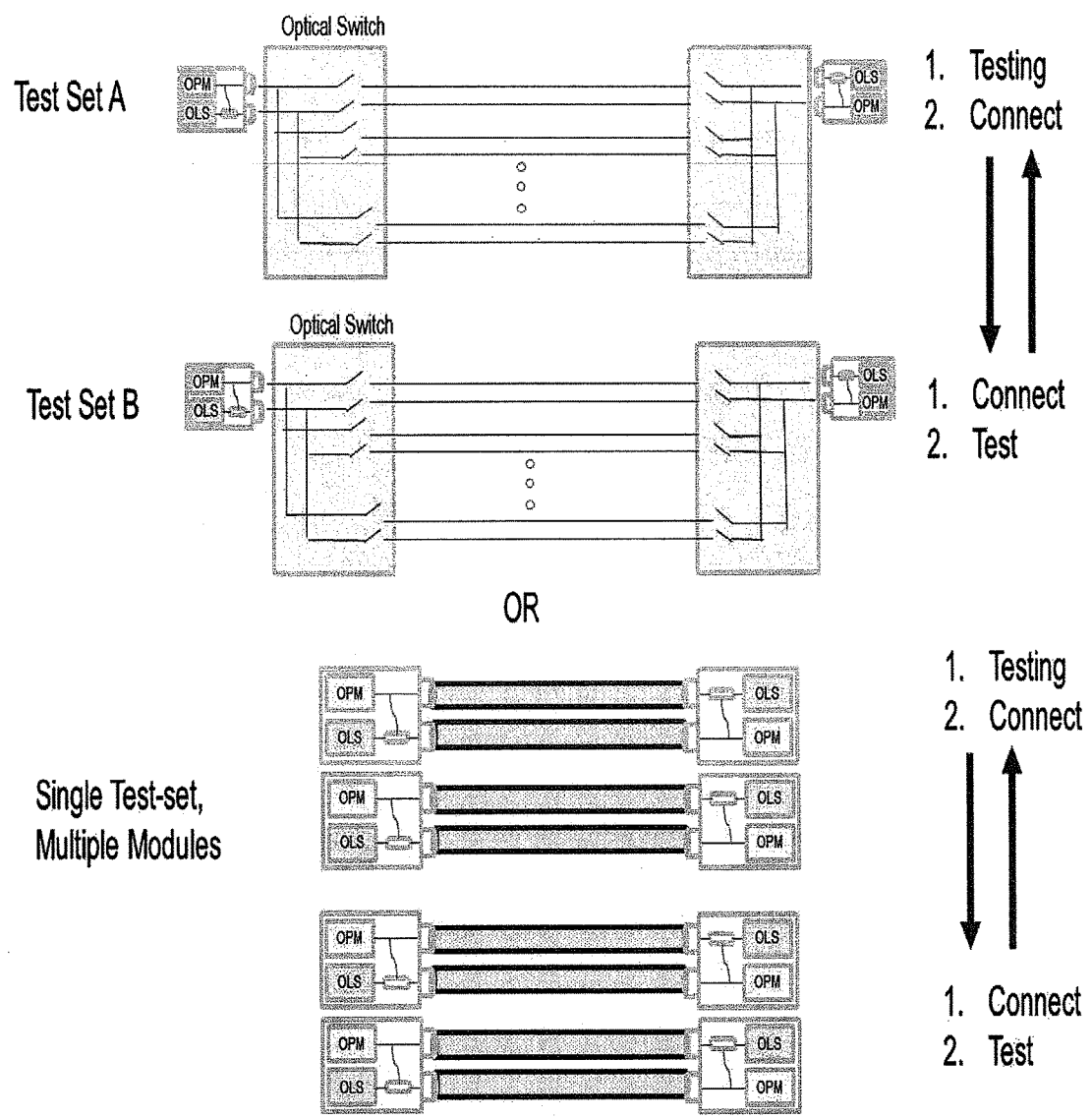
FIG. 1 illustrates different ways to test multiple fibers at the same time using multiple instrument functions, according to an exemplary embodiment.

Referring to the drawings, FIG. 1 illustrates different ways to test multiple fibers at the same time using multiple instrument functions, according to an exemplary embodiment.

The parallel functionality can exhibit itself in the following ways, as depicted in FIG. 1:

1. Multiple instrument functions can test multiple fibers at the same time thereby reducing test time. As depicted under "Test Set A" and "Test Set B" of FIG. 1, a plurality of instrument functions, comprising the optical light source (OLS) and optical power meter (OPM), are depicted to carry out the testing of multiple fibers at the same time thereby considerably reducing the test time.

2. One instrument function can be setup to test a fiber (such as connecting the instrument to the fiber under test), while the another instrument is performing a test, so that overall test time for the two fibers is the longer of the two activities (either set-up or test), but the overall test time is shorter overall than testing each fiber in series.

3. Combining the two ways describes above so that multiple functions are performing tests, while a parallel set of multiple functions are performing setup, as depicted under "Single Test-set, Multiple Modules" in FIG. 1.

Advantages and benefits of the invention include, but are not limited to effective test times considerably being reduced from N*(Serial Test time) (for N fibers being tested serially) and effective test times to (Serial Test time)/N (for N fibers being testing in parallel).

To achieve any of the scenarios described above, a user may use a single test program that allows the user to view multiple instruments as a single instrument with multiple input/output ports, different embodiments of which have been describes above and depicted in FIG. 1 of the drawings.

Such a single test program allows for easier setup and faster overall test time as everything happens in parallel.

Although the above discussion uses the example of testing plurality of optical fiber, the above discussed single test program allows for easier setup and faster overall test time for other types of transmission mediums, well known in the art, such as copper, wireless transmission medium etc. as well.

Figure 2:
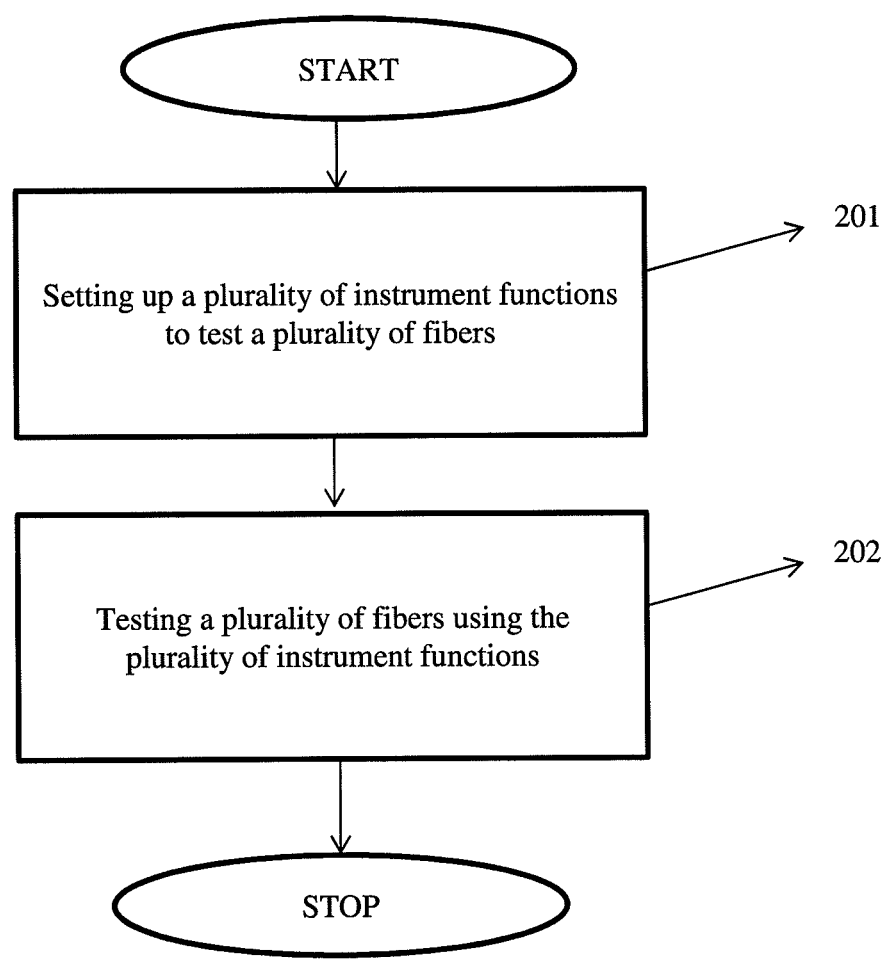
FIG. 2 is a flowchart describing the testing of multiple fibers at the same time using multiple instrument functions, according to an exemplary embodiment.

FIG. 2 is a flowchart describing the testing of multiple fibers at the same time using multiple instrument functions, according to an exemplary embodiment.

As shown in the flowchart of FIG. 2, a plurality of instrument functions may be set-up to test a plurality of fibers at the same time 201. Following that testing of the plurality of fibers using the plurality of instrument functions may be carried out 202. Such a process drastically reduces the test time it would have taken to perform tests on all the fibers in a serial order.

Again, as discussed above, the steps of the process describes in the flowchart of FIG. 2 may be achieved by a user using a single test program that allows the user to view multiple instruments as a single instrument with multiple input/output ports.

Although the above discussion uses the example of testing a plurality of optical fibers, the above discussed single test program also allows for easier setup and faster overall test time for other types of transmission mediums, well known in the art, such as copper wires, wireless transmission mediums etc.

Figure 3:
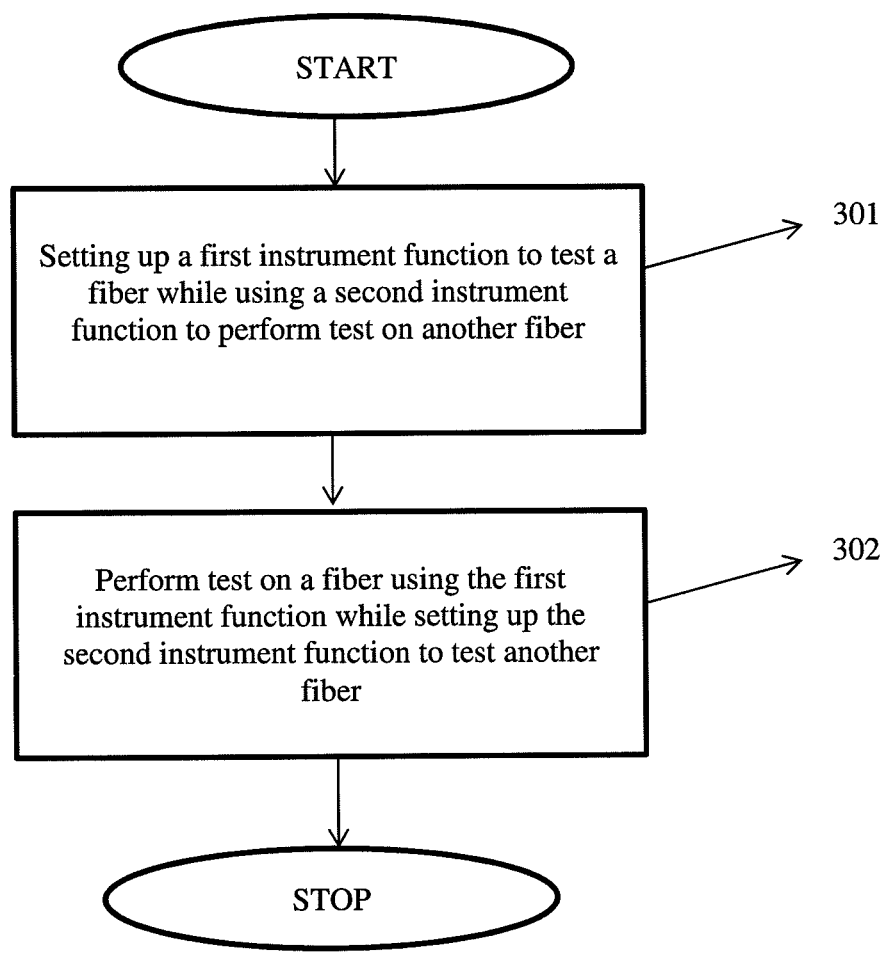
FIG. 3 is a flowchart describing the setup and testing of multiple fibers at the same time using multiple instrument functions, according to another exemplary embodiment.

FIG. 3 is a flowchart describing the setup and testing of multiple fibers at the same time using multiple instrument functions, according to another exemplary embodiment.

As shown in the flowchart of FIG. 3, a first instrument function may be set up to test a fiber while a second instrument function is performing test on another fiber 301. Following that, the first instrument function may be used to perform test on a fiber while the second instrument function is being set up to perform test on another fiber 302.

In such a process, as described above with reference to FIG. 3, overall test time for the two fibers is the longer of the two activities (either set-up or test), but the overall test time is shorter overall than testing each fiber in series.

Again, as discussed above, the steps of the process describes in the flowchart of FIG. 3 may be achieved by a user using a single test program that allows the user to view multiple instruments as a single instrument with multiple input/output ports.

Although the above discussion uses the example of testing plurality of optical fiber, the above discussed single test program also allows for easier setup and faster overall test time for other types of transmission mediums, well known in the art, such as copper wires, wireless transmission mediums etc.

Figure 4:
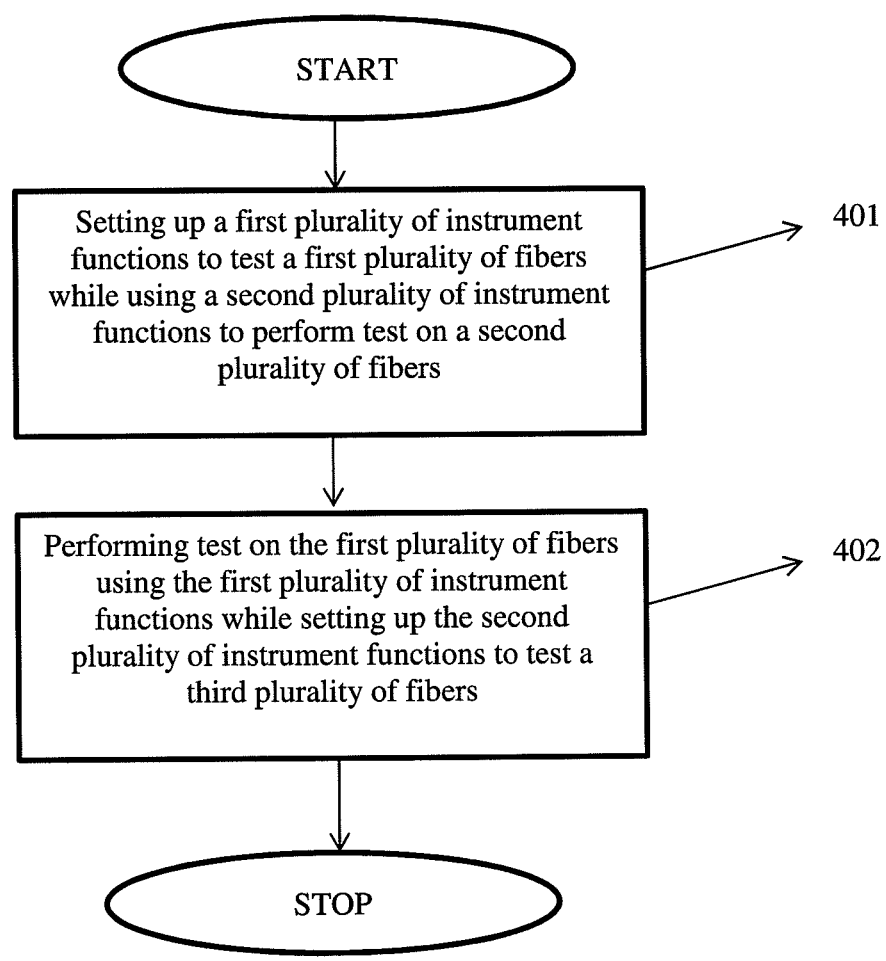
FIG. 4 is a flowchart describing the setup and testing of multiple fibers at the same time using multiple instrument functions, according to another exemplary embodiment.

FIG. 4 is a flowchart describing the setup and testing of multiple fibers at the same time using multiple instrument functions, according to another exemplary embodiment.

As shown in the flowchart of FIG. 4, a first plurality of instrument functions may be set up to test a first plurality of fibers while a second plurality of instrument functions are performing test on a second plurality of fibers 401. Following that, the first plurality of instrument functions may be used to perform test on the first plurality of fibers while the second plurality of instrument functions are being set up to perform test on a third plurality of fibers 402, according to an exemplary embodiment.

Again, as discussed above, the steps of the process describes in the flowchart of FIG. 4 may be achieved by a user using a single test program that allows the user to view multiple instruments as a single instrument with multiple input/output ports.

Although the above discussion uses the example of testing plurality of optical fiber, the above discussed single test program also allows for easier setup and faster overall test time for other types of transmission mediums, well known in the art, such as copper wires, wireless transmission mediums etc.

Figure 5:
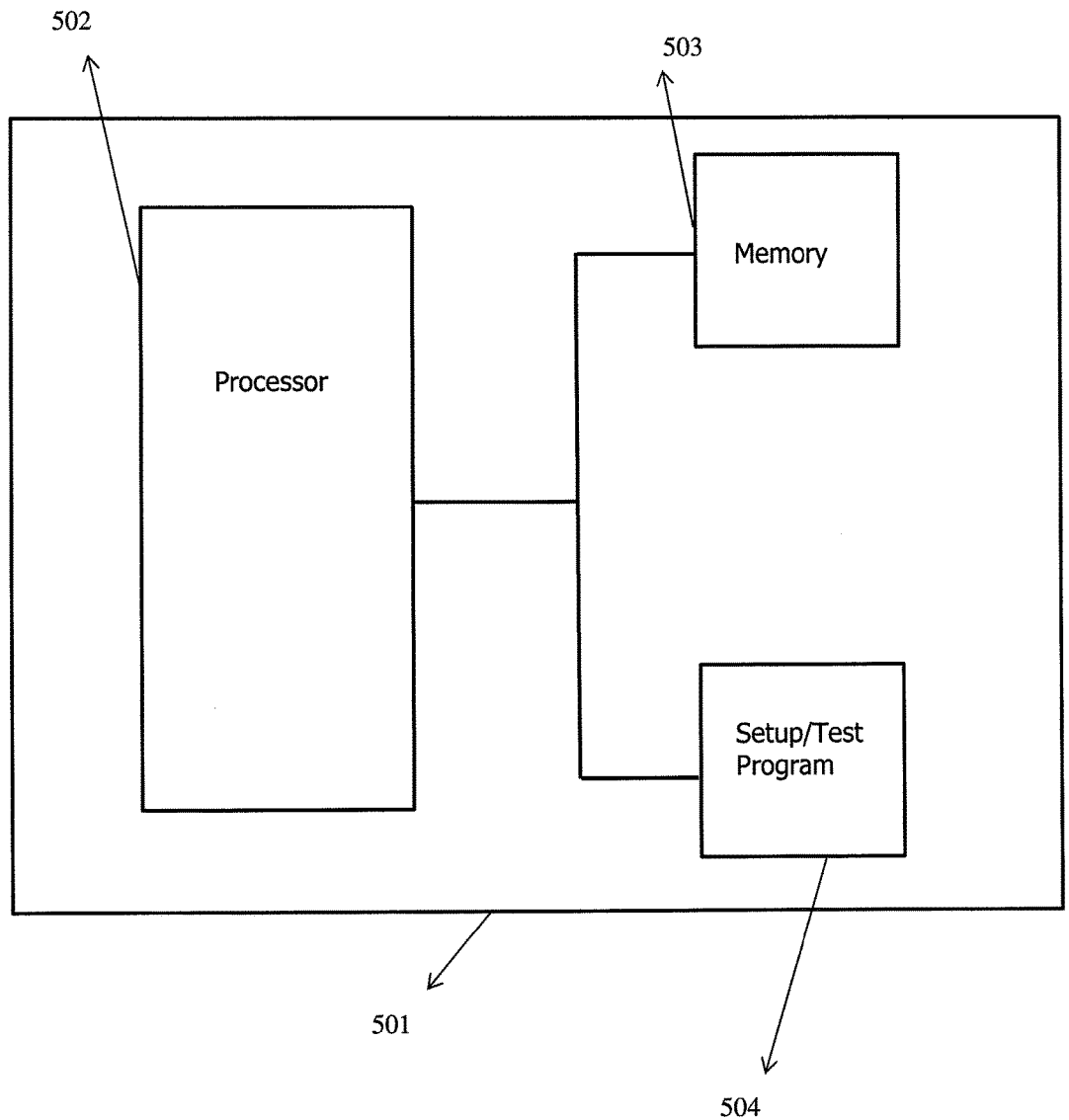
FIG. 5 illustrates a functional block diagram of an embodiment of an apparatus which performs setup and testing of multiple fibers at the same time using multiple instrument functions.

FIG. 5 illustrates a functional block diagram of an embodiment of an apparatus which performs setup and testing of multiple fibers at the same time using multiple instrument functions. The fiber testing apparatus 501 includes a memory 503, a processor 502, and a Setup/Test Program 504, according to an exemplary embodiment. An example of a processor is an ARM Xscale 806 Mhz processor. An example of a memory is an 8 Gbit NAND flash memory. The setup/test program may be incorporated into the memory according to another exemplary embodiment. Accordingly, the memory/the setup/test program may store a program code/operating software which in-turn instructs the processor 502 to setup and test a plurality of fibers using a plurality of instrument functions 504 as described in the flowcharts of FIGS. 2, 3, and 4 above. The program code/operating software can also be stored on a non-transitory computer readable medium.

Although the above discussion uses the example of testing plurality of optical fiber, the above discussed single test program also allows for easier setup and faster overall test time for other types of transmission mediums, well known in the art, such as copper wires, wireless transmission mediums etc.

Although benefits of testing a plurality of fibers at the same time are listed above, the benefits are not limited thereto.

As mentioned above, the embodiments described above are merely exemplary and the general inventive concept should not be limited thereto. While this specification contains many features, the features should not be construed as limitations on the scope of the disclosure or the appended claims. Certain features described in the context of separate embodiments can also be implemented in combination. Conversely, various features described in the context of a single embodiment can also be implemented in multiple embodiments separately or in any suitable sub-combination.

What is claimed is:

1. A method of testing a plurality of transmission mediums, using a testing device incorporating at least one processor and a single test program that allows a user to view multiple instruments as a single instrument with multiple input and output ports, the method comprising:

setting up a first instrument function to perform tests on a first transmission medium of the plurality of transmission mediums, using the single test program, while concurrently testing a second transmission medium of the plurality of transmission mediums using a second instrument function; and setting up the second instrument function to perform tests on a third transmission medium of the plurality of transmission mediums, using the single test program, while concurrently testing the first transmission medium using the first instrument function;

wherein the plurality of transmission mediums are one of fiber, copper, or wireless trasmission medium.

2. A method of testing a plurality of transmission mediums, using a testing device incorporating at least one processor and a single test program that allows a user to view multiple instruments as a single instrument with multiple input and output ports, the method comprising:

setting up a first plurality of instrument functions to perform test a first plurality of transmission mediums, using the single test program, while concurrently testing a second plurality of transmission mediums using a second plurality of instrument functions; and setting up the second plurality of instrument functions to perform test on a third plurality of transmission mediums, using the single test program, while concurrently testing the first plurality of transmission mediums using the first plurality of instrument functions;

wherein the plurality of transmission mediums are one of fiber, copper or wireless transmission medium, and the plurality of first transmission mediums, the plurality of second transmission mediums and the plurality of third transmission mediums are one of fiber, copper or wireless transmission medium.

3. An apparatus for testing a plurality of transmission mediums, the apparatus comprising:
  at least one memory operable to store program code;
  a plurality of instrument functions; and
  at least one processor operable to read the program code and operate as instructed by the program code, the program code including:
    first testing code configured to cause the at least one processor to set up a first instrument function to perform tests a first transmission medium and concurrently perform tests on a second transmission medium using a second instrument function;
  wherein the plurality of transmission mediums are one of fiber, copper or wireless transmission medium, and the first transmission medium, the second transmission medium and the third transmission medium are one of fiber, copper or wireless transmission medium.

4. The apparatus according to claim 3, wherein the program code further includes:
  second testing code configured to cause the at least one processor to set up the second instrument function to perform tests on a third transmission medium and concurrently perform tests on the first transmission medium using the first instrument function.

5. A non-transitory computer readable recording medium storing a program used in an apparatus, including at least one processor, for testing a plurality of transmission mediums, the program causing said at least one processor to:
  set up a first instrument function to perform tests a first transmission medium and concurrently perform tests on a second transmission medium using a second instrument function; and
  set up the second instrument function to perform tests on a third transmission medium and concurrently perform tests on the first transmission medium using the first instrument function.

6. The non-transitory computer readable recording medium according to claim 5, wherein,
  the plurality of transmission mediums are one of fiber, copper or wireless transmission medium, and
  the first transmission medium, the second transmission medium and the third transmission medium are one of fiber, copper or wireless transmission medium.

7. A method of testing a plurality of fibers, the method comprising:
  setting up a first instrument function to test a first fiber while concurrently testing a second fiber with a second instrument function, each of the first instrument function and second instrument function utilizing an instrument comprising an optical light source and an optical power meter connected to each end of the first fiber and the second fiber;
  testing the first fiber with the first instrument function while concurrently setting up the second instrument function to test a third fiber,
  wherein setup and testing of the first and second instrument functions are controlled by a testing device incorporating at least one processor and a single test program.

8. The method of claim 7, wherein the testing device allows a user to view the instruments of the first and second instrument function as a single instrument with multiple input and output ports.

9. The method of claim 7, wherein the first fiber is a plurality of first fibers, the second fiber is a plurality of second fibers, and the third fiber is a plurality of third fibers.

10. The method of claim 9, wherein the instrument comprises an optical light source and an optical power meter connected to each end of the plurality of fibers by an optical switch.

11. An apparatus for testing a plurality of fibers, the apparatus comprising:
  at least one memory operable to store program code;
  at least one processor operable to read the program code and operate as instructed by the program code, the program code including:
    first testing code configured to cause the at least one processor to set up a first instrument function to perform tests on a first fiber and concurrently perform testing on a second fiber using a second instrument function, each of the first instrument function and second instrument function utilizing an instrument comprising an optical light source and an optical power meter;
    second testing code configured to cause the at least one processor to perform testing on the first fiber using the first instrument function and concurrently set up the second instrument function to perform tests on a third fiber;
  wherein the apparatus allows a user to view the instruments of the first and second instrument function as a single instrument with multiple input and output ports.

12. The apparatus of claim 11, wherein the instrument comprises an optical light source and an optical power meter connected to each end of the fiber.

13. The apparatus of claim 11, wherein the first fiber is a plurality of first fibers, the second fiber is a plurality of second fibers, and the third fiber is a plurality of third fibers.

14. The apparatus of claim 13, wherein the instrument comprises an optical light source and an optical power meter connected to each end of the plurality of fibers by an optical switch.

* * * * *